No. 893,033. PATENTED JULY 14, 1908.
E. L. THOMPSON.
AUTOMATIC SPRINKLER APPARATUS.
APPLICATION FILED MAY 18, 1907.
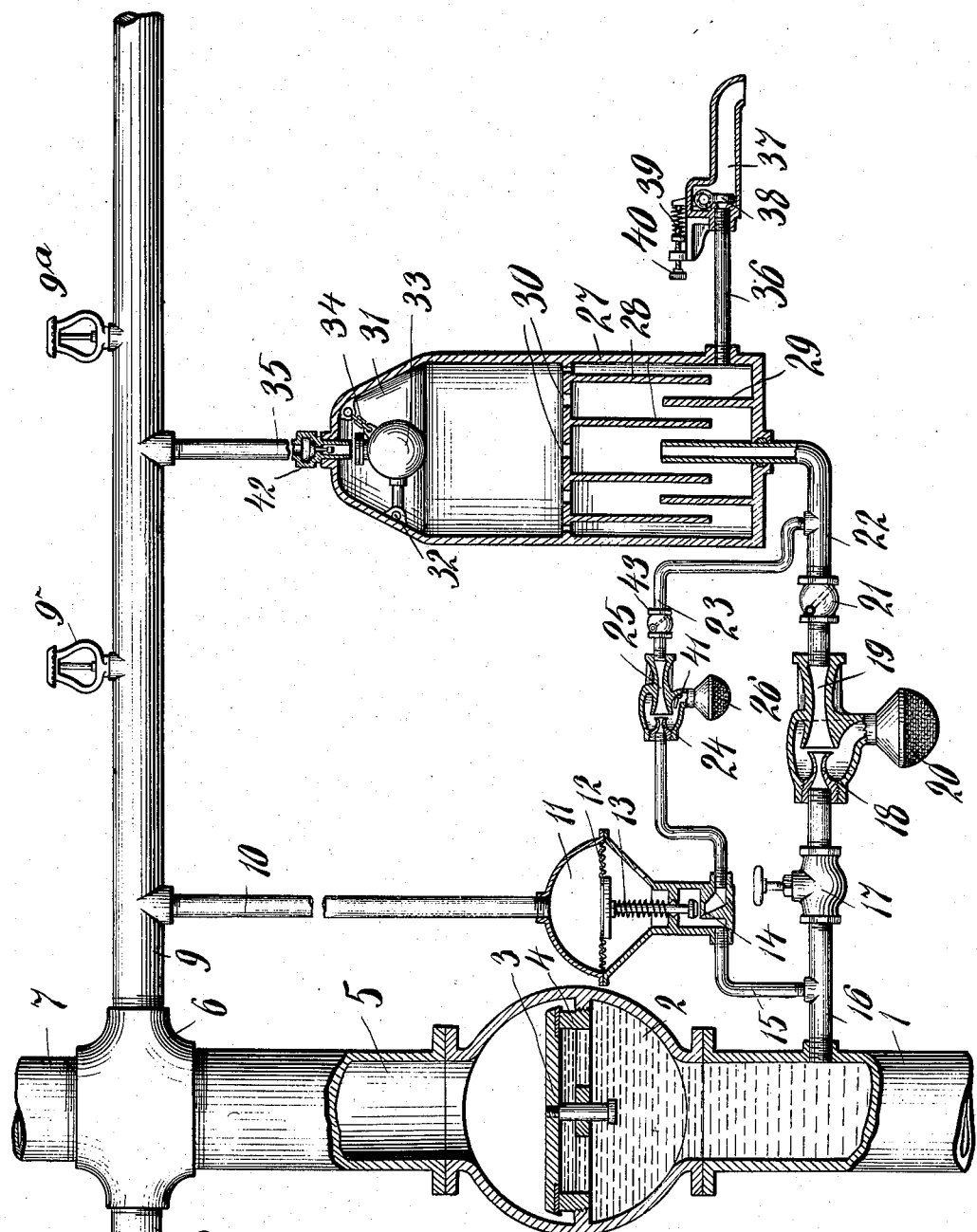
WITNESSES:
Josephine A. Greene.
Jessie B. Kay
INVENTOR
Everett L. Thompson
B
Duncan & Duncan ATTORNEYS

UNITED STATES PATENT OFFICE.

EVERETT L. THOMPSON, OF DOVER, NEW JERSEY.

AUTOMATIC SPRINKLER APPARATUS.

No. 893,033.      Specification of Letters Patent.      Patented July 14, 1908.

Application filed May 18, 1907. Serial No. 374,420.

*To all whom it may concern:*

Be it known that I, EVERETT L. THOMPSON, a citizen of the United States, and resident of Dover, in the county of Morris and State of New Jersey, have made a certain new and useful Invention Relating to Automatic Sprinkler Apparatus, of which the following is a specification, taken in connection with the accompanying drawing, forming part of the same.

This invention relates to automatic sprinkler apparatus and relates especially to sprinkler apparatus comprising water operated air compressing devices for maintaining the air pressure in dry pipe distributing systems or for otherwise supplying compressed air in connection with sprinkler systems.

In the accompanying drawings showing in a somewhat diagrammatic way an illustrative embodiment of this invention in elevation partly in section, the supply pipe 1 connects with a valve casing 2 in which dry pipe mechanism of any desired character may be installed, the simple check valve 3 being indicated as coöperating with the seat 4. The riser 5 above the valve casing connects with the distributing system comprising the pipes 7, 8, 9, connected to the junction 6 and having suitable sprinkler heads, such as 9ª, as is usual.

The water pipe 16 provided with the valve 17 is connected to the supply pipe 1 and to the injector air compressing device which may comprise a nozzle 18 of any desired shape to direct the water jet into the throat 19 and draw air or other desired fluid medium through the screen 20 and force the same together with the water through the throat and past the check valve 21 so as to discharge the same through the pipe 22 into the separator 27. This separator may be of any desired construction to separate the water and water vapor from the air or other compressed medium to the desired extent. A series of baffle plates 28 preferably of circular form may be supported from a transverse partition in the separator so as to extend downward around the inlet pipe and similar circularly arranged baffles 29 may extend upward from the opposing wall of the separator so as to form a staggered passage for the water, suitable apertures 30 being arranged as desired in the partition for the escape of the air or other compressed fluid medium, the term air being subsequently used in this case as covering any such medium. If desired, a suitable water valve may be used in the separator to automatically prevent the access of water to the air line 35 which may supply the compressed air to the distributing system or other part of the sprinkler apparatus desired, such as water pressure tanks. As indicated a suitable valve is shown as mounted on the float 33 which may be pivoted about the pin 32 and also provided with the loose connection 34. The rise of water in the separator to an undesirable extent would lift the float 33 so that the valve mounted thereon would close the opening into the air line and prevent any water entering the same. When the water receded from the chamber 31 of the separator the float would fall, withdrawing the valve from its seat, the parts being so proportioned as to effect this result. A suitable check valve 42 is also preferably used in the air line to prevent leakage therefrom under any conditions.

Any desired throttling device may be installed on the discharge pipe 36 connected with the separator. The pivoted valve 38 is shown as closing the discharge orifice and the spring 39 acting upon the valve arm indicated normally holds the valve closed so that a minimum pressure is always maintained in the separator and the air thereby compressed to the desired extent before being forced into the air line and distributing system. This pressure may be adjusted by regulating the adjusting screw 40 mounted in a suitable lug on the discharge spout 37 and connected with the spring 39 as indicated. This air compressing device is manually controlled and operates on the opening of the hand valve 17, the water being forced into the compressing device by a force pump or other means connected with the supply pipe 1 and of course provision may be made to connect the discharge spout 37 with the pump, if desired, so as to have a closed water circuit and save waste of power and water.

In addition to the compressing device described which may be operated from time to time an automatic air compressing device may be employed to automatically maintain the desired pressure in the distributing system or other part of the sprinkler apparatus. This compressing device may comprise a suitable nozzle 24 coöperating with the throat 25 so as to draw air through the screen 26 and past the check valve 41 into the throat, the water and entrained air being forced through the pipe 23 past the check valve 43 and into the separator. This compressing device is shown as connected to the supply pipe through the pipe 15 and automatic valve, the valve 14 controlling the admission of water to the compressing device. This valve is mounted on a suitable stem connected to the diaphragm 12 in the diaphragm chamber 11. A spring 13 of the desired strength normally forces this diaphragm and valve upward into open position while an air pipe 10 leading from the distributing system or other point to which the air is supplied admits air under the pressure in the system to the diaphragm chamber, so that when normal air pressure exists in the distributing system the control valve is closed and this automatic compressing device is inoperative. As soon, however, as the air pressure in the distributing system falls below the desired amount the spring forces the diaphragm and valve upward against the diminished pressure, opening the automatic valve 14 and allowing water to enter the compressing device until sufficient additional air pressure is created in the distributing system to bring it up to the desired amount, whereupon this compressing device is automatically shut off.

Having described this invention in connection with an illustrative embodiment thereof, to the details of which disclosure it is not, of course, to be limited, what is claimed as new and what is desired to be secured by Letters Patent is set forth in the appended claims.

1. In combination in sprinkler apparatus, a supply pipe, a distributing system connected therewith, an injector air compressing device and a separator connected to said supply pipe through a connection having a hand valve therein; said separator being provided with a water valve and throttling device and connected to said distributing system, an air line having a check valve therein, and an automatic injector air compressing device and automatic control valve connected to said supply pipe and said separator, said control valve being connected with said distributing system and operated by the air pressure therein to automatically maintain said air pressure.

2. In combination in sprinkler apparatus, a supply pipe and a dry pipe distributing system connected therewith, a separator provided with a throttling device connected to said distributing system, an injector air compressing device connected to said separator and said supply pipe and an automatic injector air compressing device and automatic control valve connected to said separator and supply pipe, said control valve being connected with said distributing system and operated by pressure therein.

3. In combination in sprinkler apparatus, a supply pipe and a dry pipe distributing system connected therewith, a separator connected with said distributing system and an injector air compressing device and automatic control valve for operating the same connected to said separator and supply pipe, said control valve being connected with said distributing system and operated thereby.

4. In combination in sprinkler apparatus, a dry pipe distributing system, a separator connected with said distributing system, a source of water under pressure and an air compressing device and automatic control valve connected to said separator and said source of water, said control valve being connected with said distributing system and operated by the pressure therein.

5. In combination in sprinkler apparatus, a water supply pipe, a separator to be connected with and supply air to sprinkler apparatus, an injector air compressing device and an automatic valve connected to said separator and water supply pipe, said control valve having an air connection with said separator and being operated by the pressure supplied thereby.

6. In combination in sprinkler apparatus, a water supply pipe, a separator to supply air to sprinkler apparatus and an injector air compressing device and valve connected to said separator and water supply pipe.

7. In combination in sprinkler apparatus, a separator to be connected with and supply air to sprinkler apparatus and an injector air compressing device and valve to be connected with said separator and a source of water under pressure to compress said air.

8. In combination in sprinkler apparatus, a separator comprising a water valve and throttling device to be connected with and supply air under pressure to sprinkler apparatus and an air compressing device to be connected with said separator and with a source of water under pressure to compress said air.

9. In combination in sprinkler apparatus, a separator to be connected with and supply compressed air to sprinkler apparatus and a compressing device and automatic control valve to be connected with said separator and with a supply of water under pressure to compress said air, said control valve being operated by said air pressure.

10. In combination in sprinkler apparatus, a dry pipe distributing system, an air compressing device connected with and supplying air to said distributing system, and automatic control means connected with said distributing system to automatically operate said compressing device when the pressure falls abnormally in the distributing system and to shut off said compressing device when the air pressure becomes normal and to keep the same shut off when the system comes into emergency operation.

11. In combination in sprinkler apparatus, a distributing system and connected water supply pipe of a sprinkler apparatus, an air compressing device connected with and operated by a water connection from said sprinkler apparatus and connected with and supplying compressed air to said sprinkler apparatus, and automatic control means connected with said apparatus and said compressing device to automatically control the supply of water to said compressing device.

12. In combination in sprinkler apparatus, a distributing system and connected water supply pipe of a sprinkler apparatus, an air compressing device and valve having a water connection with said sprinkler apparatus to operate said compressing device by water therefrom and an air connection between said compressing device and said sprinkler system to supply air thereto.

13. In combination sprinkler apparatus, a dry pipe distributing system and connected water supply of a sprinkler apparatus, an air compressing device and valve having a water connection with said water supply to operate said compressing device by water therefrom and an air connection between said compressing device and said distributing system to supply air thereto.

EVERETT L. THOMPSON.

Witnesses:
 JNO. R. HAMILTON,
 A. J. RICHARDS.